United States Patent [19]

Newman et al.

[11] Patent Number: 4,867,620

[45] Date of Patent: Sep. 19, 1989

[54] PROTECTIVE DEVICE FOR A MACHINE TOOL

[75] Inventors: Rodney J. Newman, Cincinnati; L. Wayne McGuffey, Okeana, both of Ohio

[73] Assignee: Newact, Incorporated, Cleves, Ohio

[21] Appl. No.: 256,981

[22] Filed: Oct. 13, 1988

[51] Int. Cl.⁴ ............................ B23C 9/00; B23Q 11/08
[52] U.S. Cl. ............................ 409/134; 29/DIG. 50; 74/608; 384/15; 408/67
[58] Field of Search ............................ 409/134, 219; 408/241 G, 67; 144/251 A; 74/608, 609, 614; 29/DIG. 50, DIG. 56, DIG. 94; 384/15

[56] References Cited

U.S. PATENT DOCUMENTS

| | | |
|---|---|---|
| 853,190 | 5/1907 | McMillan . |
| 1,096,588 | 5/1914 | Baker et al. ............. 409/219 |
| 1,676,311 | 7/1928 | Zimmermann ............. 384/15 |
| 1,679,912 | 8/1928 | Mondloch ............. 409/134 X |
| 1,903,865 | 4/1933 | Johnson ............. 409/219 X |
| 1,918,878 | 7/1933 | Tross ............. 409/219 X |
| 2,253,846 | 8/1941 | Cornell ............. 409/134 X |
| 2,542,419 | 2/1951 | Longstreet ............. 384/15 |
| 3,090,284 | 5/1963 | Dunning ............. 409/134 |
| 3,195,415 | 7/1965 | Shorb . |
| 3,490,123 | 1/1970 | Clark . |
| 3,785,418 | 1/1974 | Hennig et al. ............. 384/15 X |
| 3,825,050 | 7/1974 | Glover ............. 150/52 R |
| 3,998,221 | 12/1976 | Collins ............. 128/132 D |
| 4,449,870 | 5/1984 | Suzuki ............. 409/134 |
| 4,596,162 | 6/1986 | Walter et al. ............. 74/608 |
| 4,676,666 | 6/1987 | Pfluger et al. ............. 384/15 |

FOREIGN PATENT DOCUMENTS

| | | | |
|---|---|---|---|
| 1006696 | 4/1957 | Fed. Rep. of Germany | ........ 384/15 |
| 2137197 | 2/1973 | Fed. Rep. of Germany | ........ 384/15 |

*Primary Examiner*—Z. R. Bilinsky
*Attorney, Agent, or Firm*—Wood, Herron & Evans

[57] ABSTRACT

A protective device for the top surface of a slotted milling machine table preferably comprises a rubber cover sized to overlay a desired length of the table at one end thereof, the surfaces of the cover each having a raised peripheral lip and longitudinally extending beads and ribs. The downwardly directed beads fit within the slots of the milling table to hold the cover in place while the downwardly directed ribs provide air space between the placed cover and the table, thereby inhibiting rust. The upwardly directed raised lip prevents coolant spillage from the top of the cover while the coolant return holes enable excess coolant to be returned to the slots residing thereunder. To provide protection for a reduced length table, the cover is made reversible by providing a transverse lip portion on one of the surfaces, located inboard of the coolant return holes. The cover is cut transversely inboard of the transverse lip portion, new holes are punched and the cover is placed upon the milling machine table so that the transverse lip portion is directed upwardly at an end of the table.

15 Claims, 3 Drawing Sheets

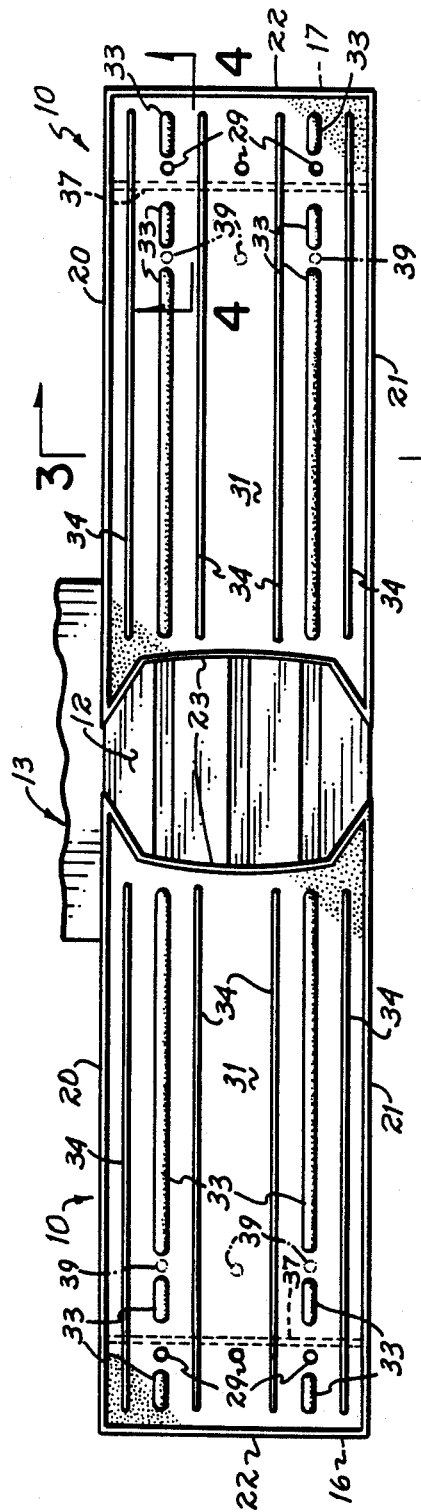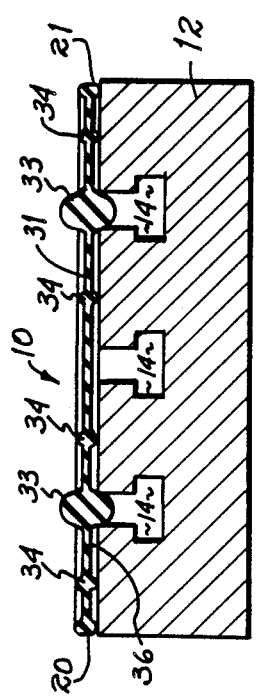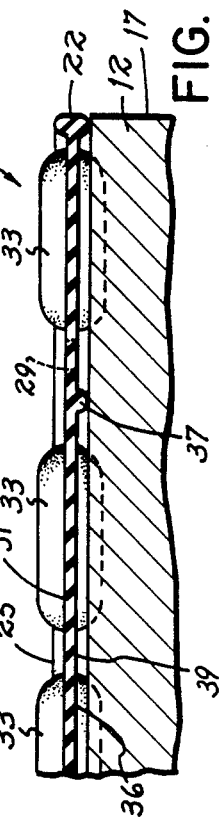

PROTECTIVE DEVICE FOR A MACHINE TOOL

FIELD OF THE INVENTION

This invention relates to a protective device for the top surface of an elongated T-slotted milling machine table.

BACKGROUND OF THE INVENTION

A typical milling machine table is elongated and has longitudinally extending inverted T-shaped slots to aid in mounting a workpiece holder, such as a vise, to the table. The T-slots also serve as collecting channels to return coolant to a collector mounted at one end of the table. A standard Bridgeport type milling machine table has one of two standard lengths, either 42" or 49" and a width of 9", with three parallel, spaced T-slots.

Milling machine tables of this type are susceptible to damage when tools such as wrenches, collets, files, drill chucks, parallels, etc. are placed on the top surface thereof. Such placement can result in nicks, burrs and indentations in the table which eventually destroy the accuracy of the milling operation. Moreover, metal chips often accumulate in the T-slots during milling, thus creating a difficult clean-up operation after and during use.

It is common among machinist to place a sheet of plastic, wood or metal on the top surface of the table in order to prevent build up of chips or dirt in the T-slots. However, covers of this type prevent coolant from being returned via the T-slots, and the coolant runs onto the floor, creating a safety hazard and poor working conditions. This excessive coolant loss also increases operating costs.

Tross U.S. Pat. No. 1,918,878 and Shorl U.S. Pat. No. 3,195,415 disclose elongated channel members which fit into the T-slots of machining tables. The channel members prevent cuttings or dirt from getting into the slots, and also have holes formed therethrough to enable coolant return flow into the T-slots. Suzuki U.S. Pat. No. 4,449,870 discloses a similar T-slot member which can be adjusted to accommodate T-slots of varying width. While such devices enable coolant to be returned via the T-slots, and further prevent the accumulation of matter in the T-slots, they do not provide adequate protection for the top surface of the milling machine table.

It is desirable to provide a single device which can be efficiently used with machine tools of varying table dimensions such that it isn't necessary to provide a comprehensive inventory of many different devices, one for each tool.

It is then an object of this invention to provide a protective device which simultaneously prevents filing or dirt accumulation in the T-slots, promotes return coolant flow through the T-slots, and protects the top surface of the table itself.

It is another object of this invention to provide a protective device which can be adapted to fit machine tools of varying table dimension.

Moreover, it is an object of this invention to provide a protective device which is reusable and adapted to be used for either standard length of slotted milling machine table.

SUMMARY OF THE INVENTION

To these ends, according to a preferred embodiment of the invention, a protective device for a milling machine table comprises a rubber cover sized to overlay one end of a 49" long milling table, the cover having edges coextensive with the edges of the table. The top and bottom surfaces of the cover each have a raised lip which extends around the periphery thereof adjacent the edge, longitudinally extending beads sized to be received within standard size T-slots and smaller longitudinally extending ribs interspersed between the beads and lip. Adjacent a first, exterior end, the cover has coolant return holes extending completely therethrough, with one hole for each T-slot. Preferably, the beads are discontinuous in the vicinity of, or proximate, the holes. A second, interior end of the cover opposite the first end is shaped to engage the side of a vise.

With the cover in place upon the table, the downwardly directed beads of one of the surfaces are received within the T-slots of the table, thereby to maintain the position of the cover with respect to the table. The downwardly directed ribs provide some air space between the cover and the top surface of the table, thereby inhibiting rusting of the table. The upwardly directed raised lip prevents coolant spillage from the cover. The upwardly directed beads and ribs direct coolant to the holes, and the upwardly directed beads also enable tools to be placed on the cover above the path of coolant.

According to a feature of the invention, the presence of beads and ribs on both surfaces of the cover enables it to be modified and reversed for use with one end of a 42" table. To provide this feature, one of the surfaces has a transversely extending lip portion located inboard of the coolant return holes. To modify the cover, the cover is cut transversely along the outboard side of the transversely extending lip portion, thereby providing a new exterior end for the cover. Additional, reduced length coolant holes are punched through the cover inboard of the transverse lip portion, preferably with one additional hole for each T-slot. If desired, markings or indicia may be provided in one or both of the surfaces of the cover to indicate the proper location for the reduced length holes. It is also preferable that the beads protruding from both surfaces be discontinuous in the vicinity of, or proximate, the coolant return holes and the markings.

When in place, the full length cover prevents damage to the top of one end of a 49" milling table, while also preventing the accumulation of particles in the T-slots. Moreover, in addition to protection of the table surface, the cover promotes coolant return flow through the T-slots. By transversely cutting the cover outboard of the transverse lip, punching new holes inboard of the transverse lip, and reversing the surface of the cover on the table, similar protection for the top surface of one end of a standard 42" milling table can be provided.

These and other features of the invention will be more readily understood in view of the following detailed description and the drawings in which:

BRIEF DESCRIPTION OF THE DRAWINGS

FIG. 2 is a plan view of a protective cover according to a preferred embodiment of this invention;

FIG. 3 is a cross-sectional view taken along lines 3—3 of FIG. 2;

FIG. 4 is a cross-sectional view taken along lines 4—4 of FIG. 2;

DETAILED DESCRIPTION OF THE DRAWINGS

Figure 1:
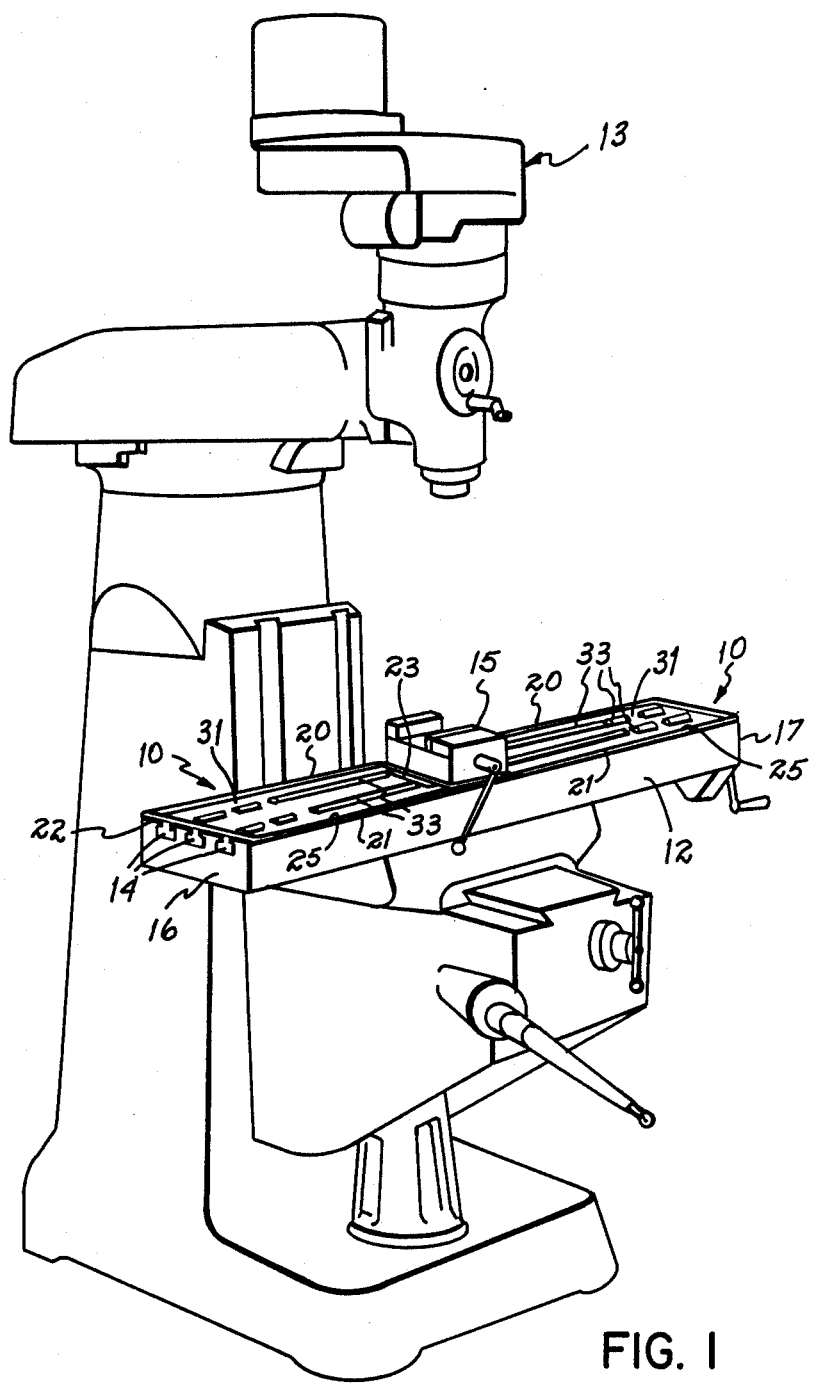
FIG. 1 shows a milling machine, with a protective covers according to a preferred embodiment of this invention in place upon both ends of the milling machine table.

FIG. 1 shows a protective cover 10 according to a preferred embodiment of this invention located at each end of a milling machine table 12 of a standard milling machine 13, the milling machine table 12 having three parallel, spaced T-slots 14. A vise 15 is also mounted to the table 12 approximately half way between the ends 16 and 17 of the table. While the cover 10 of this invention may be of any material which will protect the top of the table 12, it is preferably of oil resistant synthetic rubber, and is formed by molding. This enables ease in manufacture and provides for easy cleaning and reuse. It also facilitates the reversibility feature that will be explained in more detail later.

While FIG. 2 shows a cover 10 overlaying both ends 16 and 17 of the table 12, for simplicity, the cover 10 will only be described with respect to end 17 of the table 12. Longitudinal side edges 20 and 21 and an exterior edge 22 of the cover 10 are sized to be coextensive with the corresponding edges of table end 17. An interior edge 23 of the cover 10 is relieved to expose a portion of the table 12 between longitudinal side edges 20 and 21. This shape enables the cover 10 to abuttingly engage the side of a Kurt brand precision machine vise, a widely used vise manufactured by the Kurt Manufacturing Company. The vise is located approximately halfway between ends 16 and 17. The cover 10 is preferably about 9" wide to match the width of a standard milling table 12 and about 19⅜" in length from a tip of interior edge 23 to exterior edge 22. This length corresponds roughly to about half the length of the standard 49" table (24½") minus about half the total length occupied by the vise 15.

Preferably, a raised lip 25 extends around the periphery of both surfaces of the cover 10 adjacent edges 20, 21, 22 and 23. However, if the cover 10 is not to be made reversible, it is only necessary that one of the surfaces, a designated top surface, have a raised lip 25. Spaced inwardly from exterior edge 22, adjacent a first end of the cover 10, three coolant return holes 29 extend completely through the cover 10. Each of the coolant return holes 29 is aligned with a T-slot 14 in the table 12 when the cover 10 is in place. The lip 25 prevents spillage of coolant from the top of the cover 10, while the coolant return holes 29 enable excess coolant to be collected by the T-slots 14 and returned to a side of the table 12. The coolant return holes are preferably circular in shape, and about 7/16" in diameter.

A first surface 31 and a second surface 36 of the cover 10, shown as the bottom and top surfaces in FIG. 3 respectively, have at least one, but preferably two longitudinally extending beads 33 which protrude outwardly and are sized and spaced to be received within two of the T-slots 14 of the table 12. The downwardly directed beads 33 of a bottom surface position and retain the cover 10 in place upon the table 12 during use. The beads 33 are longitudinally aligned with the outer two of the three holes 29 and insertion of the downwardly directly beads 33 into the T-slots 14 vertically aligns the holes 29 with the T-slots 14.

Longitudinally extending ribs 34 also protrude outwardly from the first and second surfaces 31 and 36. The downwardly directed ribs 34 provide air spaces between the cover 10 and the table 12, thus preventing the occurrence of condensate between two otherwise contacting surfaces and inhibiting rusting of the table 12. The upwardly directed beads 33 and ribs 34 direct coolant to the holes 29. Tools that are laid transversely across cover 10 will be supported by the upwardly directed beads 33, and out of the path of coolant flow.

Although the sizes of the ribs 34, the beads 33 and the lip 25 are not critical to the invention, for reversible use, they preferably protrude outwardly about 1/16", ⅜" and ¼", respectively, from each surface of the cover 10, which is about ⅛" thick. If only one length of table 12 is to be accommodated by the cover 10, for instance the 49" length only, and no reversible use is desired, neither upwardly directed ribs 34 nor upwardly directed beads 33 are required. However, in this case it would be preferable to provide a number of spaced, upwardly directed ribs 34 of about ¼" to substantially match the size of the upwardly directed raised lip 25.

As shown in the drawings, it is not essential to the invention that the beads 33 extend the entire length of the cover 10. In fact, discontinuities are preferred in at least the upwardly directed beads 33 proximate the coolant return holes 29 in order to promote fluid flow. Preferably, these discontinuities have a length of about 1½ inches.

According to a feature of the invention, the cover 10 can be modified for reversible use in order to accommodate the shorter 42" length machine table. To provide reversibility, the raised lip 25 of one of the surfaces, bottom surface 31 in the Figures, includes a transversely extending lip portion 37. This lip portion 37 is located inboard of the coolant return holes 29, preferably a little more than about 3 inches from exterior edge 22.

To convert the cover 10 for reversible use, a transverse cut is made across cover 10 just outside, or outboard of, the transverse lip portion 37. Preferably, the cut reduces the length of the cover by about 3 inches for use with the reduced length table. New coolant return holes, or modified cover coolant return holes, are formed at desired locations spaced inboard of transverse lip portion 37 and longitudinally aligned with the beads 33. The new holes can be formed by cutting or punching through the cover 10. The desired locations for the new holes may be designated by hole locating indicia 39, or markings, in first surface 31 (shown in FIG. 2). To facilitate punching of the new holes, it is preferred that the beads 33 of the bottom surface 31 be discontinuous proximate the marks 39 for a length of about one inch.

After the cover 10 has been cut transversely and the new holes punched, it is ready to be placed in reverse fashion on the table 12. Second surface 36 now becomes the bottom surface for the reduced length cover 10, and is placed upon the standard 42" length table. The length of the cut cover 10 in its longest dimension should be approximately 16⅜ inches, corresponding to about one half of the length of a 42" milling table minus about half of the total length occupied by the vise 15.

While the above description constitutes a preferred embodiment of the invention, it is to be understood that the invention is not limited thereby and that in light of the present disclosure, various other alternative embodiments will be apparent to one of ordinary skill in the art. For instance, various bead and rib configurations can be provided for the top and bottom surfaces of the cover without departing from the scope of the invention as particularly set and claimed. The invention requires only that the cover have at least one coolant return hole aligned with a T-slot, an upper surface with a peripheral lip, and a bottom surface with at least one downwardly directed bead to retain the cover within a slot of the table and a downwardly directed spacing means to provide space between the cover and the table.

Figure 5:
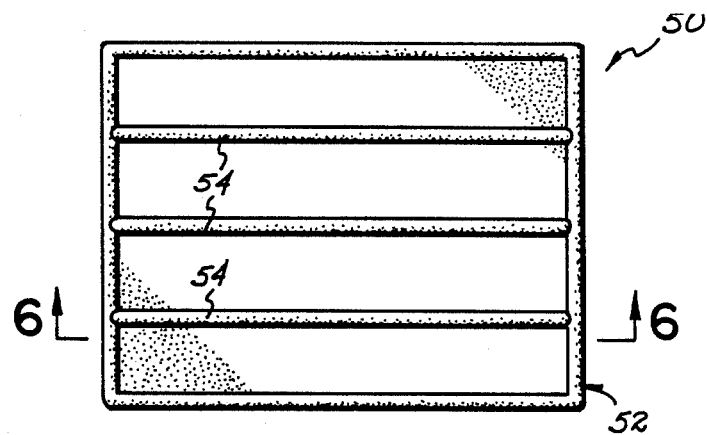
FIG. 5 shows a plan view of an alternate form of the protective cover of this invention.
Figure 6:
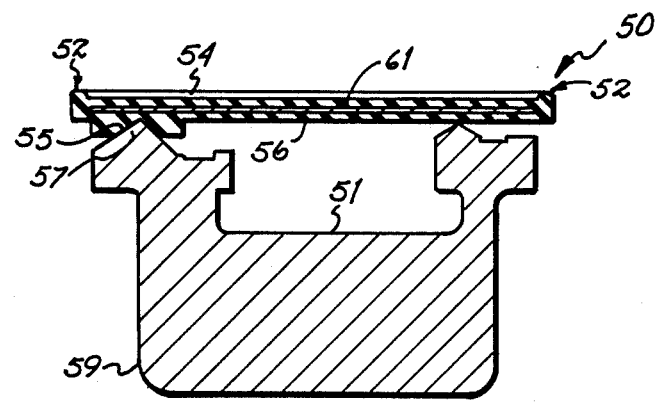
FIG. 6 shows a sectional view taken along lines 6—6 of FIG. 5, the cover bridging and protecting a typical lathe way.

While the above described cover is particularly suitable for protecting the top surface of a milling machine, it may also be slightly modified to provide protection for other machine tools. For instance, FIGS. 5 and 6 show a cover 50 suitable for protecting the way surface 51 of a lathe 59. The cover 50 is preferably molded from rubber and the top surface has a raised lip 52 extending about the periphery thereof. The lip 52 preferably protrudes about 3/16" and prevents tools from rolling off the top of the cover 50. If desired, the top surface may also have spaced parallel ribs 54 extending widthwise. Preferably, these ribs 54 are similar in shape and dimension than the lip 52. On one side thereof, an inverted V-channel 55 is formed in the bottom surface 56 of the cover 50 and sized to fit over an inverted V-shaped way 57 of the lathe 59, thereby holding the cover 50 in place.

The cover 50 is preferably about 12" wide, corresponding to the width of most standard lathes, about ⅜" thick in the middle and about 15/16" thick at the thickest point, adjacent V-channel 55. The length of the cover 50 can be varied according to preference, depending upon how much surface area is needed for tools and the length of the lathe surface 51 that is to be protected from dust and milled particles. The lip 52 preferably extends upwardly about 3/16" from the top surface of the cover 50.

If desired, the cover 50 may also have embedded support means 61, or metal stiffeners, formed therein to provide sufficient support in bridging the width of the lathe way.

We claim:

1. A protective device for the top surface of a longitudinally slotted milling machine table comprising:
   a cover having first and second surfaces and at least one coolant flow hole formed therethrough adjacent a first end thereof;
   a raised lip extending about the periphery of said second surface of said cover;
   at least one longitudinally directed bead protruding from said first surface and sized to fit into one of the longitudinal slots to position and retain said cover on the table when said first surface is placed thereon, said placement of said cover vertically aligning said at least one coolant hole with one of the longitudinal slots in the table; and
   at least one longitudinally directed rib protruding from said first surface of the cover to provide air space between said placed cover and said table.

2. The protective device of claim 1 adapted for use with a reduced length table wherein said first surface has a raised lip extending about the periphery thereof, said first surface also having a raised lip portion extending transversely across said cover inboard of said at least one coolant return hole, the second surface of the cover having at least one longitudinally directed bead sized to fit into a slot of the table and at least one longitudinally directed rib, said second surface bead and rib adapted to retain the cover in position and to provide air space between the cover and said reduced length table, respectively, when said second surface of said cover is placed upon said reduced length table to provide reversible protection.

3. The protective device of claim 2 wherein said first surface has at least one hole locating indicia located inboard of said transverse lip portion to designate a desired location for at least one modified cover coolant return hole, each said hole locating indicia being aligned with one of said beads.

4. The protective device of claim 3 wherein said beads are discontinuous proximate said markings.

5. The protective device of claim 1 wherein each said bead is discontinuous proximate an aligned coolant return hole.

6. The protective device of claim 1 wherein said cover has a second end opposite to said first end and longitudinal side edges therebetween, said cover being relieved at said second end to expose a table portion between said longitudinal side edges.

7. The protective device of claim 1 wherein said cover has three holes formed therethrough, two longitudinally extending beads, and four longitudinally extending ribs.

8. The protective device of claim 7 wherein said second surface has spaced, longitudinally extending ribs protruding therefrom, said second surface ribs being substantially the same size as said second surface raised lip.

9. The protective device of claim 2 wherein said first and second surfaces of said cover each have a raised lip, two beads and four ribs.

10. The protective device of claim 1 wherein said cover is elastomeric.

11. The protective device of claim 10 wherein said elastomeric cover is rubber.

12. A protective device for the top surface of a milling machine table having longitudinally directed slots, and further adapted for use with tables of varying lengths, comprising:
   an elastomeric cover having first and second surfaces and coolant return holes located adjacent a first end thereof;
   at least two longitudinally extending spaced beads protruding outwardly from each of said surfaces, each of said beads being longitudinally aligned with a coolant return hole, said beads sized and spaced to fit into said table slots so that when one of said surfaces of said cover is residing on said table, said coolant return holes are vertically aligned with said slots and the beads of said one surface retain the cover in place, each of said beads being discontinuous in the vicinity of one of said holes;
   four longitudinally extending ribs protruding outwardly from each of said surfaces, the downwardly directed ribs of said one of said surfaces providing air space between said residing cover and said table; and
   a raised lip extending around the periphery of said cover on each of said surfaces, said one of said surfaces having a transversely extending lip portion located inboard of said coolant return holes with respect to said first end to provide an exterior end for the cover when cut to accommodate a reduced length table.

13. The protective device of claim 12 wherein said one of said surfaces has hole locating indicia located thereon inboard of said transversely extending lip portion to designate desired locations for modified cover coolant return holes thereby to facilitate modification of said cover for reversible use with a reduced length table.

14. The protective device of claim 12 wherein said cover has a second end opposite said first end and longitudinal side edges therebetween, said second end being relieved to expose a portion of said table between said longitudinal side edges.

15. A protective device for the top surface of a longitudinally slotted milling machine table comprising:

a cover having first and second surfaces;
a raised lip extending about the periphery of said second surface of said cover;
at least one longitudinally directed bead protruding from said first surface and sized to fit into one of the longitudinal slots to position and retain said cover on the table when said first surface is placed thereon; and
said cover being of a performable material, thereby to facilitate the punching of a coolant flow hole therethrough.

* * * * *